(12) United States Patent
Hintz et al.

(10) Patent No.: US 11,599,807 B2
(45) Date of Patent: Mar. 7, 2023

(54) INTERACTIVE SEARCH TRAINING

(71) Applicant: Microsoft Technology Licensing, LLC, Redmond, WA (US)

(72) Inventors: Gerold Hintz, Munich (DE); Eric Crestan, Munich (DE); Andreas Bode, Munich (DE); Tobias Rolf Hassmann, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 16/916,855

(22) Filed: Jun. 30, 2020

(65) Prior Publication Data

US 2021/0406723 A1    Dec. 30, 2021

(51) Int. Cl.
*H04L 29/08* (2006.01)
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 8,117,197 B1 | 2/2012 | Cramer et al. | |
| 8,312,009 B1 | 11/2012 | Bostock | |
| 8,838,582 B2 | 9/2014 | Hornkvist et al. | |
| 9,619,528 B2 | 4/2017 | Riley et al. | |
| 9,626,361 B2 | 4/2017 | Greenwood et al. | |
| 2012/0158621 A1 | 6/2012 | Bennett et al. | |
| 2018/0052928 A1* | 2/2018 | Liu | G06F 16/951 |
| 2018/0239829 A1 | 8/2018 | Dialani et al. | |
| 2018/0329947 A1 | 11/2018 | Roitman et al. | |
| 2019/0129958 A1* | 5/2019 | Liao | G06F 16/3326 |
| 2019/0278857 A1 | 9/2019 | Ni et al. | |

OTHER PUBLICATIONS

Application as Filed in U.S. Appl. No. 16/367,849, filed Mar. 28, 2019, 51 Pages.

(Continued)

*Primary Examiner* — Adnan M Mirza
(74) *Attorney, Agent, or Firm* — Shook, Hardy & Bacon L.L.P.

(57) ABSTRACT

Aspects of the present disclosure relate to interactive search training. A training canvas comprises results associated with a search query. The training canvas may be used as part of a training session that occurs during normal use of a search platform. When the search platform is first used, the results may be provided based on an existing model. An irrelevant result may be removed from the training canvas, such that a replacement result is added in its place. Additionally, results may be reordered, thereby indicating a ranking with which results should be displayed. Such interactions with the training canvas may be used to generate training data, such that a new model is trained accordingly. Thus, interactions with the training canvas yield high-quality training data that is usable to generate a model having equal or greater performance than a model that was trained using an equivalent amount of implicit training data.

20 Claims, 17 Drawing Sheets

(56) References Cited

OTHER PUBLICATIONS

Arif et al., "Examining Collaborative Query Reformulation", In Proceedings of the 37th International ACM SIGIR conference on Research & development in information retrieval, Jul. 6, 2014, pp. 875-878.
Mcgee, Matt, "Google SearchWiki Launches, Lets You Build Your Own Search Results Page", Retrieved from: https://searchengineland.com/google-searchwiki-launches-15561, Nov. 20, 2008, 6 Pages.
Sloan et al., "A Term-Based Methodology for Query Reformulation Understanding", In Journal of Computing Research Repository, Jan. 2016, 23 Pages.
"International Search Report & Written Opinion Issued in PCT Application No. PCT/US21/028737", dated Jul. 21, 2021, 11 Pages.

* cited by examiner

INTERACTIVE SEARCH TRAINING

BACKGROUND

Identifying and ranking relevant search results from a datastore having a previously unknown or otherwise nonstandard schema is challenging, as the datastore may use arbitrary properties. Without knowledge of which arbitrary properties are indicative of relevance, search results from the datastore for a given search query may not be ranked in a way that facilitates easy discovery of information or may comprise results that are not relevant to the search query.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to techniques for interactive search training. In examples, a training canvas is provided comprising a set of search results that are associated with a search query. When a search platform is first used, the set of search results may be provided based on an existing relevance model. A user is able to remove an irrelevant result from the training canvas, such that a replacement result is added to the canvas in its place. Additionally, the user may reorder search results within the training canvas, thereby indicating a ranking with which the search results should be displayed. The user's explicit interactions with the training canvas may ultimately be used to generate training data, such that a new relevance model may be trained accordingly.

In examples, the new relevance model is used to generate search results for the user immediately, thereby enabling the user to evaluate its performance without substantial delay. Additionally, the performance of the new relevance model may be compared to the performance of the existing relevance model. Accordingly, if the new relevance model exhibits better performance than the existing relevance model, the new relevance model may be used to generate search results for subsequent search queries received by the search platform. Thus, the explicit user interactions generate high-quality training data that is usable to generate a relevance model having equal or greater performance than a relevance model that was trained using an equivalent amount of implicit training data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
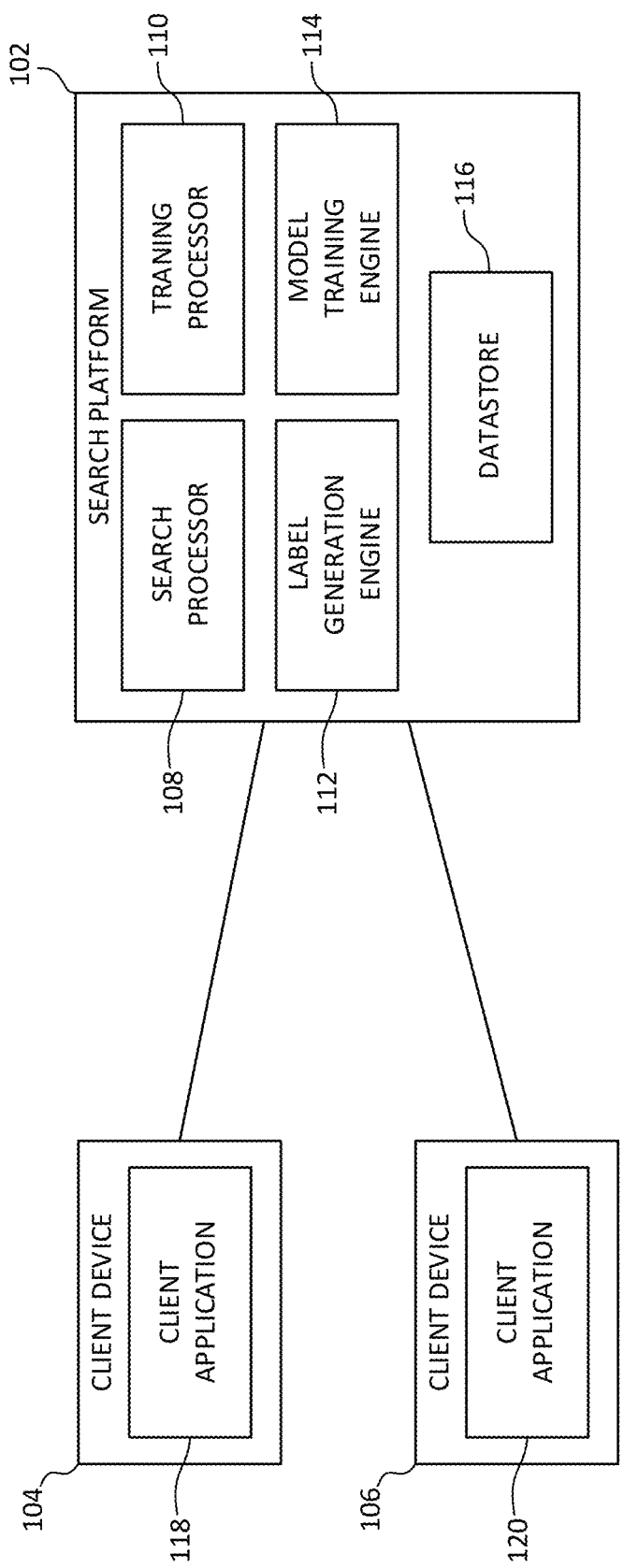
FIG. 1 illustrates an overview of an example system for interactive search training.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a datastore enables storage of data using arbitrary properties, which, for example, may be specific to the types of data stored therein. Thus, it will be appreciated that a datastore may have a distinct schema and/or distinct data collection. Given the disparate properties and values associated with different datastores, it is difficult to generate a generalized relevance model that is applicable to a wide range of datastores and still yields results that are relevant to a given search query and are therefore appropriately ranked. Accordingly, such arbitrary properties complicate the ability to identify and rank search results, especially when a search platform is first used to search the data. For example, the lack of relevance signals after an initial setup may be considered a bootstrapping problem. In such examples, it is challenging to train a relevance model to generate even somewhat relevant results. As a result, it is unlikely that users will subsequently generate high-quality implicit interactions with search results that will gradually improve the performance of the relevance model. As a result, users may be unable to locate relevant information in the datastore.

Accordingly, aspects of the present disclosure relate to techniques for interactive search training. In examples, a set of search results is identified for a search query and presented to a user via a training canvas of a search platform. The training canvas enables the user to remove results that are irrelevant to the search query and to reorder results in an order that is indicative of their respective relevance. Such interactions with the training canvas may be used to generate training data that is used to train a relevance model, thereby generating an updated model that is better suited to identify and rank relevant search results in the datastore. Such user interactions with the training canvas generate high-quality training data, such as explicit indications (e.g., result ranking and/or irrelevancy), as well as implicit indications (e.g., that a search result is relevant based on determining that a user clicked on a search result). As a result of the high-quality explicit and implicit indications, less training data may be required to generate a relevance model having equal or greater performance than an initial model or a model that was trained using only implicit training data.

It will be appreciated that a datastore and associated search results may have any of a variety of data types. For example, data stored within the data store and associated search results include, but are not limited to, text, an image, a video, and/or audio, or any combination thereof. Additionally, any of a variety of techniques may be used to store data in the datastore, such that the datastore may be a relational database and/or a graph database, among other examples. As used herein, an "irrelevant" search result is a result that should not be included in a set of search results for a given query. It will be appreciated that an irrelevant search result need not be wholly without relevance to the search query, but may instead fall below a relevance threshold or may not be perceived by a user to be relevant, among other examples.

As described above, a search platform provides a training canvas that enables a user to generate training data, which is used to train a model accordingly. The search platform may be local to a client computing device, may be implemented using a cloud computing environment (e.g., using a server computing device or distributed among a set of server computing devices), or any combination thereof. In examples, the search platform is implemented separately from one or more applications that store data in a datastore from which the search platform identifies search results. In other examples, the search platform is integrated into one or more such applications. For example, aspects of the present disclosure may be utilized in a "search-as-a-service" context, where another service hosts customer data in a cloud computing environment. In such examples, interactive search training techniques may be applied by the search platform to iteratively train a relevancy model while abstracting such aspects away from the service at which the data is stored. The search platform may provide search-as-a-service functionality for multiple datastores (and, by extension, multiple customers), each of which may have a different schema and/or data collection stored therein. Thus, it will be appreciated that the techniques described herein are applicable to any of a variety of contexts in which search results are generated from a datastore.

A training canvas may be provided as a separate user interface from a search canvas in which search results are presented to a user or, in other examples, the search canvas may be adapted into a training canvas in response to a user indication to provide feedback relating to a set of search results. For example, the search canvas may comprise a feedback control element that, when actuated by a user, adapts the search canvas to comprise one or more training control elements, similar to those that may be displayed by a training canvas described herein. As a result of such integration of a training canvas with a search canvas, training may be performed using real-life searches from users of the search platform rather than relying on synthetic searches that may not be representative of actual use. Thus, it will be appreciated that the training aspects described herein need not be implemented solely as a training canvas of a search platform.

The training canvas comprises a set of search results that are identified as being relevant to a search query based on a model. In examples, the model is an initial model that is used prior to training according to aspects of the present disclosure. The initial model may be a general model that identifies search results and associated relevancy, for example, using a BM25F model, based on term frequency-inverse document frequency (TF/IDF), or via presumptive identification of a certain properties based on attributes of associated values (e.g., identifying a "body" property based on length or a date based on formatting), among other examples. The general model may then be tuned to be better suited for the specific datastore from which it is used to generate search results as described herein. In other examples, the initial model is a preexisting model that is selected based on an indication as to the type of data for which it will be used to generate search results. For example, a preexisting model may be available for a datastore having a similar type of data to the type of data specified by the indication, such that the preexisting model is used as the initial model (rather than a general model as described above). Thus, the initial model may be a specialized model that is better suited for a given type of data and therefore provides a better starting point for subsequent training, such that the specialized model is then further tuned according to aspects described herein.

In examples, the set of search results presented in the training canvas is generated based on a search query that is entered by a user, such that the user may use search queries that are entered during the course of normal use of the search platform (e.g., an actual or routine search scenario) or that are believed to be helpful for providing training data (e.g., representative of queries like to be submitted by other users of the search platform or representative of data stored by the datastore). In another example, a set of search queries may be automatically generated and provided to the user, such that the user selects a search query from the set of search queries, which may then be used to generate the set of search results. The set of search queries may be queries that were observed by the search platform (e.g., all queries, most common search queries, queries for which users engaged in a number of reformulations above a threshold, queries in which the result selected by a user is below a threshold) or may be sample search queries from a previous search platform, among other examples. In another example, the set of search queries is generated based on processing the data that is stored by the datastore, such that the set of queries is representative of data stored therein.

In some instances, not all users of the search platform are permitted to access the training canvas. For example, an administrator of the search platform may be able to designate a user as a "trainer," thereby granting the user access to the training canvas. In other examples, only the administrator or one or more other types/groups of users are able to access the training canvas. Such techniques may be utilized to ensure that users that have access to the training canvas are those that are likely to provide strong training data that is generalizable to a larger body of searches (e.g., as may be performed by other users of the search platform), as compared to a user who may train the search platform in a way that is not necessarily generalizable to a larger population of users (e.g., according to personal preferences and biases).

As described above, a user interacts with search results presented via the training canvas, such that training data may be generated for the search platform. Example interactions include, but are not limited to, marking a search result as irrelevant, reordering search results, and/or specifying a relevancy metric for a search result (e.g., based on a scale from least relevant or irrelevant to most relevant, using a binary or four-point scale). In some instances, additional information may be requested from the user, such as a reordering explanation that indicates one or more properties associated with a search result were helpful in deciding that the search result was more or less relevant than another search result (and should therefore be ranked higher or lower, respectively). In examples, the indication is associated with a plurality of search results, such as one or more other results that were indicated as being less or more relevant than the search result. Such additional information may further strengthen the quality of the training data that is available to generate a machine learning model, thereby reducing the likelihood that the resulting model differentiates search results based on an incorrect property (e.g., based on a file extension property of a search result rather than a title).

In examples, the training canvas is not paginated, such that a finite number of search results is presented via the training canvas using a single page (as compared to a search canvas with which multiple pages of search results may be presented). Rather, when a user indicates that a search result is irrelevant, the irrelevant search result may be removed from the training canvas and replaced with a replacement search result. The replacement search result may be added in a region of the training canvas that is indicative of a search result that has the least relevance as compared to remaining results of the training canvas (e.g., at the bottom of a list or at the bottom right corner of a grid), such that intervening search results are repositioned to fill the region in which the irrelevant search result was displayed. As another example, the irrelevant result may be replaced with the replacement result, such that other search results need not be moved.

Feedback information associated with user interactions may be submitted (e.g., removing irrelevant search results, considering replacement search results, and/or reordering search results therein). Training data is generated accordingly and may comprise a set of explicit labels. For example, an irrelevant search result may be labeled as such, a label may comprise an ordered list of search results that were ranked by the user, or each search result of the submitted set may be labeled according to its relevance based on its rank within the submitted set, among other examples. Such explicit labels may be generated in addition to implicit labels that may also be used as training data, such as a label that indicates that a search result is relevant based on a user's selection of the search result or, as another example, that a search result was retained on the canvas but was not necessarily subject to an explicit user interaction. Thus, both explicit and implicit labels may be generated by a user via the training canvas.

In examples, collection and/or storage of feedback information (and other associated information) may be subject to one or more data privacy protections or criterion. For example, a user may be required to "opt-in" or otherwise consent to the collection, storage, and/or evaluation of feedback information (e.g., relating to both implicit and/or explicit user interactions with the search platform). As another example, the user may be permitted to review, edit/redact, and/or selectively restrict access to the collected feedback information. As still another example, the system may anonymize or encrypt personally identifiable information within the feedback information. An indication as to such data collection practices and/or associated data privacy protections may be provided by the search platform (e.g., displayed within the training canvas and/or a help page).

The training data is used to generate an updated relevance model, which may subsequently be utilized to generate search results for the user (e.g., in place of an initial model as described above). In examples, the training data utilized to generate the updated relevance model is that which was generated based only on that specific session with the training canvas. In other examples, additional training data may be used, such as training data from one or more previous sessions of the user and/or one or more sessions of other users, among other examples. Weights given to labels generated from past sessions may decay, thereby increasing the effect of more recent labels on the resulting model. Thus, as a result of a user interacting with the training canvas, the user is able to subsequently evaluate the behavior of the updated model and affect the performance of the search platform. Additionally, while the updated relevance model is trained according to specific interactions with the training canvas (e.g., relating to one or more search queries and associated search results), the relevance model is more widely applied to the datastore, such that the user is able to evaluate its performance for search queries that were not necessarily used when initially interacting with the training canvas to generate the training data.

Initially, an updated model may not be widely used by the search platform. For example, the model may be used only for the user for which it was generated, for users indicated as trainers, or for another subset of users. In examples, the performance of the updated relevance model is evaluated by comparing the relevance model to an existing model used by the search platform, such that it may be determined whether the updated model exhibits better performance than the existing model. Performance metrics may be presented to an administrator or other user of the search platform, thereby enabling the administrator to determine whether to replace the existing model with the updated model. As another example, a predetermined threshold may be used, such that when a metric is above the predetermined threshold, the existing model is automatically replaced with the updated model. In some examples, multiple metrics are used and may be evaluated individually or may be aggregated together based on a set of weights, among other examples.

In addition to the above-discussed difficulties of identifying and ranking relevant search results for a datastore having arbitrary properties, similar difficulties exist for determining whether a query is a query reformulation within an existing search session (e.g., specializing the query by adding a term, generalizing the query by removing a term, altering the query by substituting a term with a related term, or a combination thereof) or if the query is the beginning of a new search session. It may be helpful to identify query reformulations and group them together as part of a session, as the training data generated according to aspects described herein may then be applied to search queries and associated search results across the session, rather than only to the search query for which the training data was generated.

Accordingly, a topic model is used to evaluate subsequent search queries by a user using the training canvas. A proximity score may be generated to determine how similar a subsequent query is to one or more previous queries of a session. In examples, the proximity score is evaluated using a predetermined threshold, below which a prompt is generated and displayed to the user. As an example, the prompt may be presented when a query is identified below the predetermined threshold or after a user completes a session (e.g., clicks a search result for which the user was searching or appears to be starting a new session). The prompt may comprise a set of previous queries that appear to be part of the same session (e.g., as a result of having proximity scores within a certain range, having similar words or semantic similarity), thereby enabling the user to confirm whether the queries are part of the same session. The selected queries are labeled as such and may be used to generate an updated topic model accordingly, thereby improving the ability of the search platform to identify query reformulations that are part of the same session.

FIG. 1 illustrates an overview of an example system 100 for interactive search training. As illustrated, system 100 comprises search platform 102 and client devices 104 and 106. In examples, search platform 102 and client devices 104 and 106 communicate using a network, such as a local area network, a wireless network, or the Internet, or any combination thereof. In an example, search platform 102 is provided by a computing device, including, but not limited to, a desktop computing device, a server computing device, or a distributed computing device comprising a set of constituent computing devices. Client devices 104 and 106 may each be any of a variety of computing devices, including, but not limited to, a mobile computing device, a laptop computing device, a tablet computing device, or a desktop computing device. It will be appreciated that while system 100 is illustrated as comprising one search platform 102 and two client devices 104 and 106, any number of such elements may be used in other examples. Further, the functionality described herein with respect to search platform 102 and client devices 104 and 106 may be distributed among any number of different computing devices in other examples.

Client device 104 is illustrated as comprising client application 118. Client application 118 may be any of a variety of applications, such as a web application executing in a web browser, a native application, or a combination thereof. Client application 118 may be provided by search platform 102 or may be provided by a third party and may implement functionality provided by search platform 102 (e.g., via an application programming interface or a library), among other examples. In examples, client application 118 receives user input comprising a search query and communicates with search platform 102 to receive associated search results, which are then presented to the user. Client device 106 comprises client application 120, which is similar to client application 118 and is therefore not re-described below in detail. Client device 104 may be operated by a first user that is designated as a trainer of search platform 102, while client device 106 may be operated by a second user that is not designated as a trainer. Thus, the training aspects described herein may be provided to client device 104 for use by the first user, but may not be provided to client device 106.

Search platform 102 is illustrated as comprising search processor 108, training processor 110, label generation engine 112, model training engine 114, and datastore 116. In examples, search processor 108 receives search queries from client devices 104 and 106 (e.g., via client application 118 or 120, respectively), identifies and ranks search results from datastore 116, and provides a search canvas comprising at least a subset of the identified search results in response. Datastore 116 may store any of a variety of data, including, but not limited to, text, images, videos, and/or audio. Search processor 108 may use a model to identify and rank the search results from datastore 116 associated with a given search query. As discussed above, the model may be an initial model (e.g., a general model or a specialized model associated with a type of data in datastore 116), which may be used prior to performing the training aspects discussed herein.

In some instances, a search canvas provided by search platform 102 comprises a feedback control element that, when actuated by a user (e.g., of client device 104), adapts the search canvas into a training canvas that comprises one or more training control elements (e.g., to mark a search result as irrelevant, to reorder search results, to submit a manipulated set of search results). In other examples, a training canvas associated with search platform 102 is generated by training processor 110 and provided to client device 104 for display to the user. The training canvas may be accessible from an administrator portal of the search platform 102 (e.g., as may be displayed by client application 118 of client device 104), among other examples. Additional aspects relating to the training canvas and training control elements are discussed below with respect to FIGS. 4A-4G.

A user interacts with training control elements of a training canvas to manipulate a set of search results displayed therein. The set of search results displayed by the canvas is identified from datastore 116 using a search query, which may be provided by the user or may be selected from a set of search queries, among other examples. The user may indicate that a search result is irrelevant to the search query or may drag a search result to reorder the list of displayed results. In examples where a search result is marked as being irrelevant, training processor 110 may receive a request for an additional search result. In such examples, training processor 110 may determine the additional search result based at least in part on an irrelevant result that was removed from the canvas. Accordingly, the search experience provided by the canvas may not be a linear pagination through a fixed set of results, but may instead enable a user to explore a set of search results in a way that is similar to a tree. For example, a user may use the ambiguous search term "golf," which may yield results relating to both the sport and the vehicle. Upon gradually indicating that results relating to the sport are irrelevant, training processor 110 processes such indications to identify that additional results should be provided that relate to the vehicle instead of the sport.

In other examples, the set of search results that are initially displayed by the canvas may be a subset of those that were initially received, such that the additional search result is identified from the received set of search results (e.g., at client device 104). Thus, additional results may be obtained from training processor 110 as needed, may be aggregated into a batch, or any combination thereof. Once a user is finished interacting with the canvas, the user and/or client device 104 submits feedback information associated with the user's interactions with the training canvas, which is received by training processor 110.

The received feedback information is processed by label generation engine 112 to generate training data as described above. For example, label generation engine 112 may identify a search result that was marked as irrelevant by the user and may label the identified search result as irrelevant to the search query. As another example, label generation engine 112 generates a label comprising the ordered list of search results as submitted by the user. In some examples, the ordered list is a subset of the submitted search results. As an example, the ordered list may omit search results that are below search results for which reordering indications are present. For example, if there are five results and the user reorders search results 1-3, the ordering of the fourth and fifth results would not be included in the training data. While example labels are described herein, it will be appreciated that fewer, additional, or alternative labels may be generated. For example, a user may score each result on a scale, such that a label generated by label generation engine 112 reflects such a score. In addition to labels generated based on such explicit interactions, label generation engine may generate labels based on implicit interactions, such a user's selection of a search result for which the user was searching. Thus, both explicit and implicit labels may be generated by label generating engine 112.

Model training engine 114 processes labels generated by label generation engine 112 to generate an updated model according to aspects described herein. In examples, model training engine 114 processes only labels associated with a given teaching session. In other examples, model training engine 114 may process additional labels, such as those from previous teaching sessions of the user or from multiple users. The updated model generated by model training engine 114 is applicable not only to the search queries and associated search results for which training data was generated, but is more broadly applicable to a larger set of data in datastore 116, thereby affecting the quality of search results for queries beyond those that were used to generate the training data (e.g., for queries received from other users, such as the user of client device 106). In some instances, the weight of past labels decay, such that more recent labels have a greater effect on generating the updated model. A model generated by model training engine 114 may be used for subsequent searches by the user (e.g., either in a search canvas or a training canvas), thereby enabling the user to view the effect of the changes on search results without a substantial delay.

Initially, the updated model generated by model training engine 114 may not be widely used by search platform 102. For example, the model may be used only for the user for which it was generated, for users indicated as trainers, or for another subset of users. In examples, training processor 110 evaluates the performance of the updated model as compared to an existing model used by search platform 102 based on one or more performance metrics (e.g., using normalized discounted cumulative gain (NDCG), determining whether the updated model ranks selected search results more highly than the existing model and/or with greater consistency, whether the updated model yields a reduced average number of query reformulations within searching sessions), such that it may be determined whether the updated model exhibits better performance than the existing model. In an example where NDCG is used, a labeled testset is used for evaluation, which may be obtained automatically by creating a "held-out" set from the labels that were generated via the teaching canvas. As another example, NDGC may be computed using cross-validation on the whole set of labels rather than the held-out set.

Performance metrics may be presented to an administrator of the search platform by training processor 110, thereby enabling the administrator to determine whether to replace the existing model with the updated model. As another example, training processor 110 evaluates one or more metrics based on a predetermined threshold, such that when a metric is above the predetermined threshold, the existing model is replaced with the updated model. In some examples, training processor 110 evaluates multiple metrics, which may each be evaluated individually or together based on a set of weights, among other examples.

Training processor 110 may also evaluate search queries during a teaching session to identify query reformulations and queries that are suspected to be query reformulations of the same session. For example, a proximity score may be generated to determine how similar a subsequent query is to one or more previous queries. In examples, the proximity score is evaluated based on a predetermined threshold, below which a prompt is generated and provided to client device 104 for displayed to the user. The prompt may be presented when a query is identified below the predetermined threshold, after a user completes a session (e.g., clicks a search result for which the user was searching or appears to be starting a new session). The prompt may comprise a set of previous queries that may be part of the same session, thereby enabling the user to confirm whether the queries are part of the same session. The selected queries are labeled as such and may be used to generate an updated topic model accordingly, thereby improving the ability of the search platform to identify query reformulations that are part of the same session.

Figure 2:
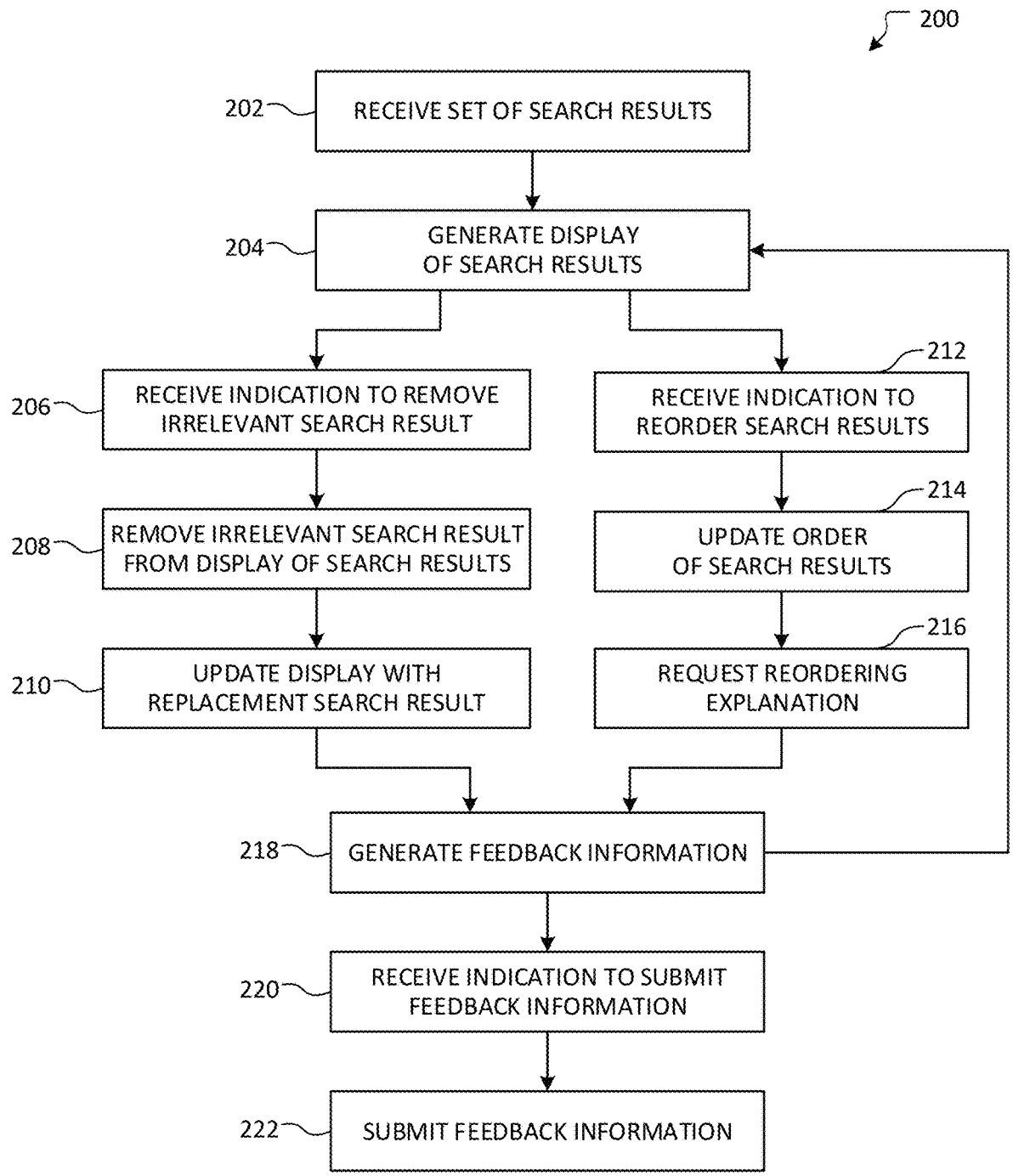
FIG. 2 illustrates an overview of an example method for interactive search training using a set of search results at a client device.

FIG. 2 illustrates an overview of an example method 200 for interactive search training using a set of search results at a client device. In examples, aspects of method 200 are performed by a client associated with a search platform, such as client application 118 or 120 of computing device 104 or 106, respectively, in FIG. 1. Method 200 begins at operation 202, where a set of search results is received. In examples, the set of search results is received from a search platform (e.g., search platform 102 in FIG. 1) and may be associated with a search query. The search query may have been provided by a user or selected from a list of search queries (e.g., via a search canvas or a training canvas) according to aspects described herein.

Flow progresses to operation 204, where a display of the search results is generated. In examples, the display is part of a search canvas or a training canvas. The display may comprise only a subset of the search results that were received at operation 202 or, in other examples, may comprise all of the search results that were received. It will be appreciated that any of a variety of techniques may be used to display the results, including, but not limited to, a vertical list, a horizontal list, and/or a grid.

Method 200 is illustrated as comprising two branches flowing from operation 204: operations 206-210 and operations 212-216. In examples, one or both branches are performed, depending on the actions of the user. For example, a user may only remove irrelevant results, in which case operations 206-210 are performed. In another example, a user only reorders the results, in which case operations 212-216 are performed. In other examples, a user may both remove irrelevant results and reorder results, in which case operations 206-210 and 212-216 are performed. Further, the branches need not be performed simultaneously or in a specific order, and may be performed any number of times and, in some examples, by different users.

In some instances, flow progresses from operation 204 to operation 206, where an indication is received to remove an irrelevant search result. The indication may be received as a result of a user actuating an irrelevant training control element associated with the search result that indicates the search result is irrelevant (for example, a button with a cross mark or a minus). Accordingly, flow progresses to operation 208, where the irrelevant search result is removed from the display of search results. In some examples, operation 208 comprises rearranging the remaining results to fill the empty region at which the irrelevant result was located. For example, the remaining results may be shifted up in instances where the results are displayed as a vertical list.

Flow progresses to operation 210, where the display of search results is updated with a replacement search result. In examples, the replacement search result is accessed from the set of search results that was received at operation 202. In other examples, a replacement search result is requested from a search platform (e.g., search platform 102 in FIG. 1). While aspects of method 200 are described in an example where singular replacement search results are requested and received, it will be appreciated that replacement results may be requested and/or received in a batch as an alternative or in addition to such aspects. In instances where the remaining results were rearranged at operation 208, the replacement result is inserted at the end of the display of search results. Returning to the above example of the vertical list, the replacement result may be added to the bottom. In other instances, the region at which the irrelevant result was located is used to present the replacement search result. Flow then progresses to operation 218, which is discussed below.

In other instances, flow progresses from operation 204 to operation 212, where an indication is received to reorder the set of search results. The indication may be received as a result of a user interacting with a reorder training control element associated with the search result, with which the user is able to drag the search result to a desired position that is indicative of an associated rank. It will be appreciated that a variety of other user experience techniques may be used to enable a user to reorder the display of results, such as permitting the user to change a number associated with a search result or click arrows to increment/decrement the relative position of the search result in a list.

At operation 214, the order of the search results is updated. For example, intervening results that are between the initial location of the reordered search result and the ending location may be graphically shifted up or down to create a region at which to display the reordered result. In some instances, flow loops between operations 212 and 214, thereby enabling the user to continue reordering the set of results until a desired order is achieved.

At operation 216, a reordering explanation is requested. In examples, operation 216 comprises generating a prompt with which the user can indicate whether one or more properties associated with the search result that was reordered at operation 212 were helpful in deciding that the search result was more or less relevant than another search result. In examples, the indication is associated with a plurality of search results, such as one or more intervening results that were rearranged at operation 214. As noted above, such additional information may further strengthen the quality of the training data available to generate a machine learning model, thereby reducing the likelihood that the resulting model differentiates search results based on an incorrect property. Flow then progresses to operation 218.

Feedback information is generated at operation 218, which comprises one or more indications relating to search results that were indicated as irrelevant (e.g., operations 206-210) and/or reordered (e.g., operations 212-216). For example, a reordering indication comprises a rank associated with the search result that was reordered at operation 212 and/or intervening search results that were updated at operation 214. In other examples, ranks for search results above the reordered search result are included in the reordering indication. The reordering indication further comprises additional information that was received at operation 216.

Flow loops between operations 204-218 while the user interacts with the training canvas to manipulate search results displayed therein. Ultimately, an indication is received to submit the feedback information at operation 220. Accordingly, flow progresses to operation 222, where the feedback information is provided to the search platform. In some instances, the feedback is provided to a training processor of the search platform, such as training processor 110 of search processor 102 in FIG. 1. It will be appreciated that while method 200 is described as an example in which feedback is provided in response to an indication to submit the feedback information, alternative techniques may be used, such as submitting feedback information periodically or as user interactions are received (e.g., at operations 206, 212, 216, and/or 218), among other examples.

Figure 3A:
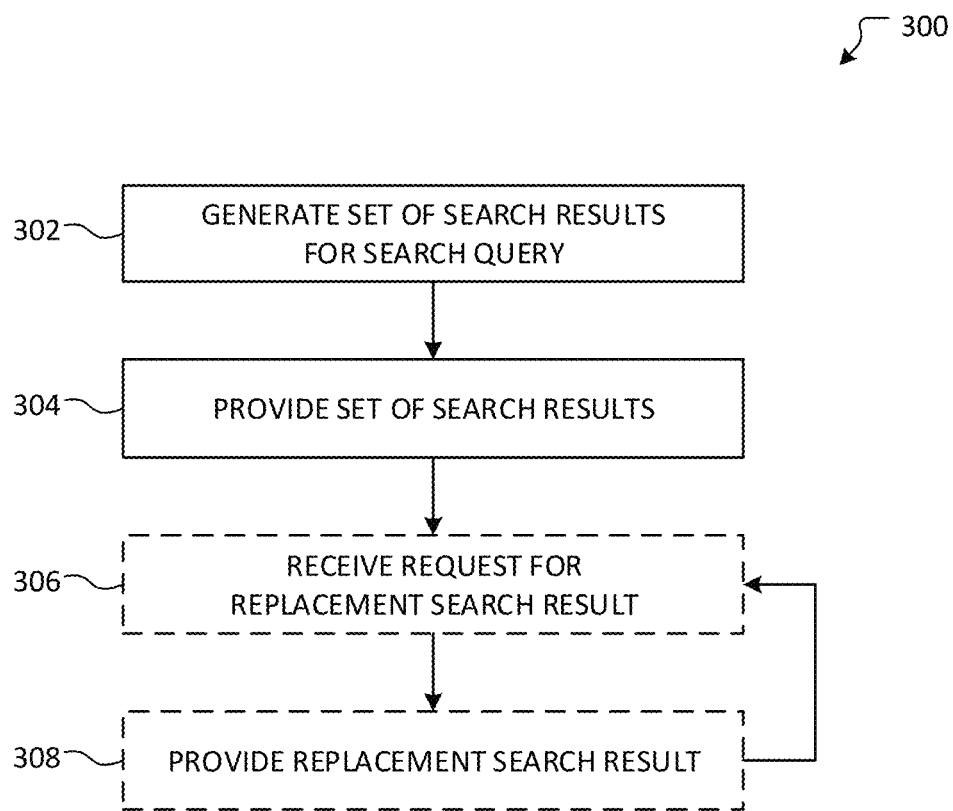
FIG. 3A illustrates an overview of an example method for providing search results according to the interactive search training aspects described herein.

FIG. 3A illustrates an overview of an example method 300 for providing search results according to the interactive search training aspects described herein. In examples, aspects of method 300 are performed by a search processor or a training processor, such as search processor 108 or training processor 110 in FIG. 1. Method 300 begins at operation 302, where a set of search results is generated for a search query. The search query may be received as part of a request for search results from a client device, such as client device 104 or 106 in FIG. 1. In examples, the set of search results is generated based on an initial model (e.g., that has not yet been trained for a specific datastore, such as datastore 116 in FIG. 1) or an existing model (e.g., that has been trained according to aspects described herein).

At operation 304, the set of search results are provided. In examples, the set of search results may be provided as a single page, rather than providing the set of search results as a series of pages. In some examples, the set of search results is received by a client device performing operation 202 of method 200 discussed above with respect to FIG. 2. The set of search results may be provided as part of a search canvas that comprises a feedback control element or may be provided as part of a training canvas according to aspects described herein. Operations 306 and 308 are illustrated using dashed boxes to indicate that, in some instances, method 300 terminates at operation 304, as may be the case when additional search results are provided as part of operation 304, thereby obviating the need of the client device to request an additional search result when a user indicates that a search result displayed in the canvas is irrelevant.

However, in other examples flow progresses to operation 306, where a request for a replacement search result is received. The request for a replacement search result may be received as a result of a client device performing aspects of operation 210 discussed above with respect to method 200 of FIG. 2. In examples, the request comprises an indication as to a session for which results were generated at operation 302 or an indication as to a search query and an index of the last-received result, among other examples. Thus, it will be appreciated that any of a variety of techniques may be used to request a replacement search result.

At operation 308, the replacement search result is provided in response to the request that was received at operation 306. An arrow is illustrated from operation 308 to operation 306 to illustrate that any number of replacement results may be provided as a user indicates results that were initially provided at operation 304 are irrelevant to the search query. While operations 306 and 308 are described as providing a single replacement result, it will be appreciated that, in other examples, requests and responses may be batched into a single request and associated response or a combination thereof. Flow ultimately terminates at operation 308.

Figure 3B:
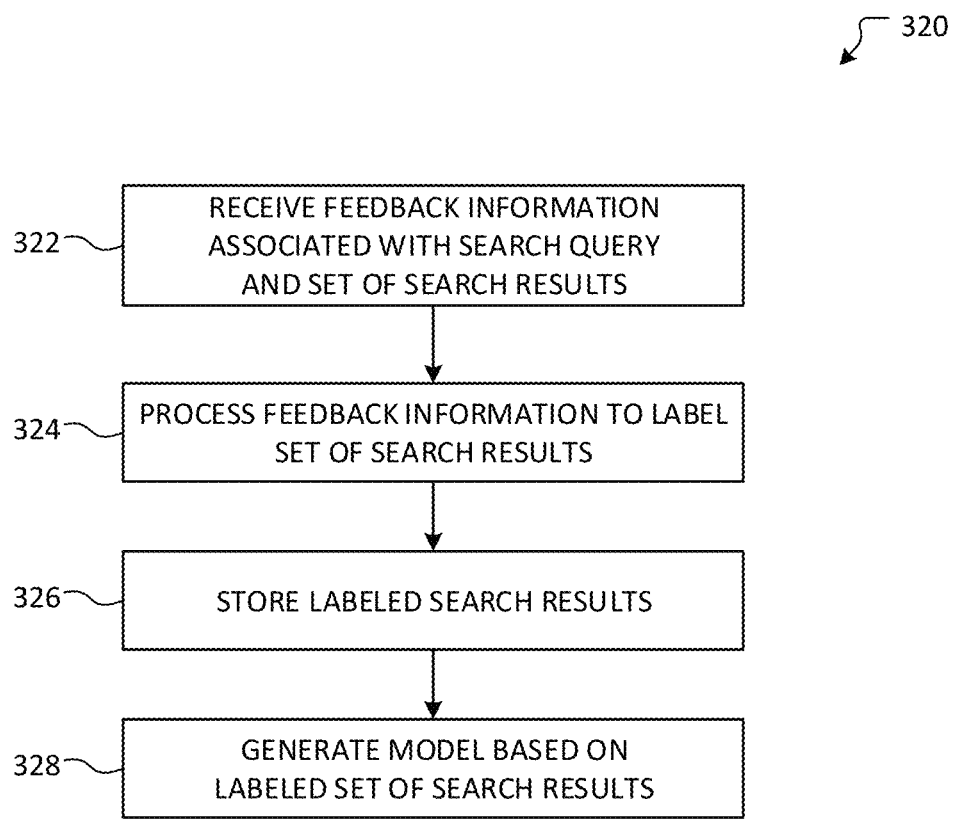
FIG. 3B illustrates an overview of an example method for generating a model based on training information generated according to the interactive search training aspects described herein.

FIG. 3B illustrates an overview of an example method 320 for generating a model based on training information generated according to the interactive search training aspects described herein. In examples, aspects of method 320 are performed by a search platform, such as search platform 102 in FIG. 1. Method 320 begins at operation 322, where feedback information associated with a search query and a set of results is received. In examples, the feedback information is received from a client device performing aspects of method 200 that were discussed above with respect to FIG. 2. The feedback information may be received by a training processor, such as training processor 110 of search platform 102 in FIG. 1.

As an example, the feedback information comprises one or more indications relating to search results that were indicated as irrelevant and/or reordered within the set of search results. For example, a reordering indication of the feedback information may comprise a rank associated with the search result that was reordered at operation 212 and/or intervening search results that were updated at operation 214. In other examples, ranks for search results above the reordered search result are included in the reordering indication. In some instances, a reordering indication of the feedback information may further comprise additional information, such as a reordering explanation.

Flow progresses to operation 324, where the feedback information is processed to label the set of search results accordingly. In examples, aspects of operation 324 are performed by a label generation engine, such as label generation engine 112 in FIG. 1. As an example, the feedback information is processed to identify a search result that was marked as irrelevant by the user. Accordingly, the search result may be labeled as being irrelevant to the search query. As another example, the feedback information is processed to generate a label comprising an ordered list of search results based on rankings that were provided by the user. As described above, the ordered list may relate to a subset of search results. As an example, the ordered list may omit search results that are below search results for which reordering indications are present. For example, if there are five results and the user reorders search results 1-3, the ordering of the fourth and fifth results would not be included in the training data. As a further example, the ordered list comprises the set of results that were presented on the canvas, rather than only the subset of results with which the user interacted. While example labels are described herein, it will be appreciated that fewer, additional, or alternative labels may be generated at operation 324. As an example, if a user scores one or more search results using a scale, feedback information comprising such scores may be processed and used to generate labels accordingly.

Moving to operation 326, the labeled search results are stored. In examples, the labels are associated with the search results and the search query. The labels may be stored in a datastore, such as datastore 116 in FIG. 1. In some examples, the stored labels are only accessible to the user by which they were created or, as another example, may be temporarily stored as part of a session of the user. In other examples, the labels may be accessible to other users, such that a model generated by another user may be trained based at least in part on the labels that were generated at operation 324.

At operation 328, a model is generated based on the labeled set of search results. In examples, aspects of operation 328 are performed by a model training engine, such as model training engine 114 of search platform 102 in FIG. 1. In some examples, the model is generated based only on labels that were generated at operation 324. In other examples, additional labels may be processed, such as those from previous teaching sessions of the user or from other users of the search platform (e.g., as may have been stored by previously performing operation 326). The model generated at operation 328 is applicable not only to the search queries and associated search results for which feedback information and training data was generated (e.g., as was received at operations 322 and 324), but is more broadly applicable to a larger set of data, thereby affecting the quality of search results for queries beyond those that were used to generate the training data. In some instances, the weight of past labels decay, such that more recent labels have a greater effect on the generated model. The model generated at operation 328 may then be used for subsequent searches by the user (e.g., either in a search canvas or a training canvas), thereby enabling the user to view the effect of the changes on search results without a substantial delay. Flow terminates at operation 328.

Figure 3C:
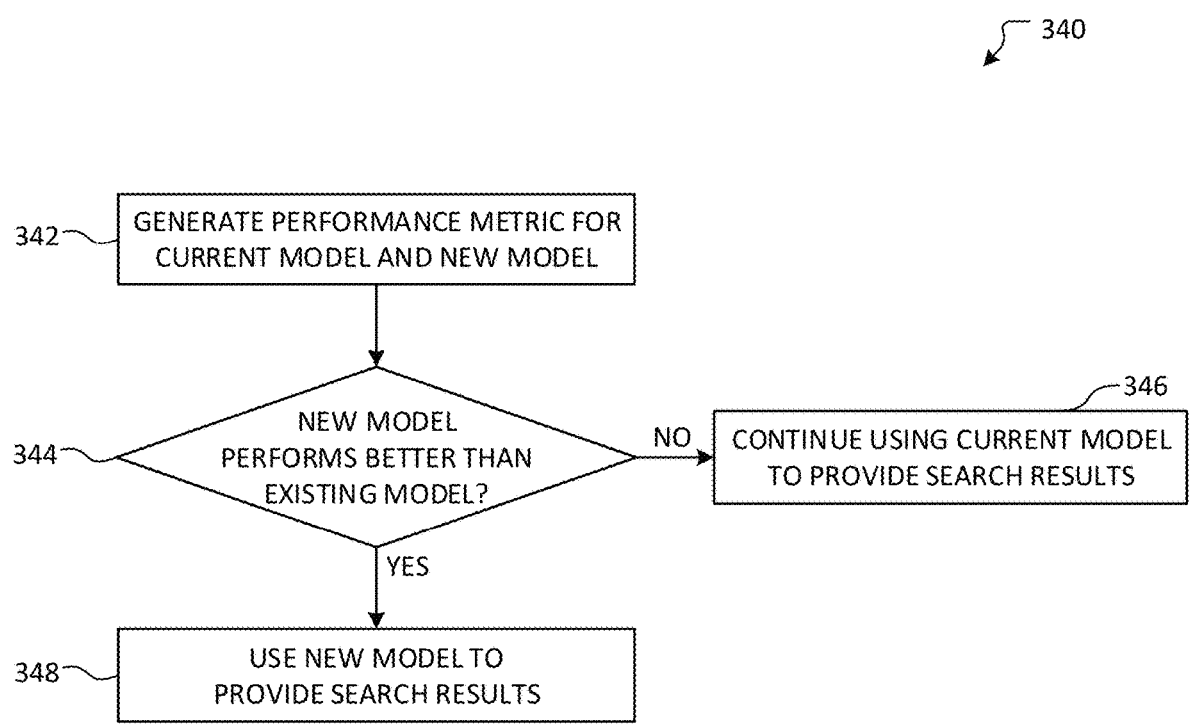
FIG. 3C illustrates an overview of an example method for comparing models to determine whether a new model that was trained according to aspects described herein should be used to generate search results in place of an existing model.

FIG. 3C illustrates an overview of an example method 340 for comparing models to determine whether a new model that was trained according to aspects described herein should be used to generate search results in place of an existing model. In examples, aspects of method 340 are performed by a training processor, such as training processor 110 of search platform 102 in FIG. 1. Method 340 begins at operation 342, where a performance metric is generated for an existing model and a new model. In examples, the metric compares the two models or, as another example, the metric is generated for each model such that the models may be compared based on their respective performance metric. Any of a variety of performance metrics may be used, including, but not limited to, NDCG, an average rank for selected search results, or an average number of query reformulations within searching sessions. The new model may be a model that is generated according to the interactive search training aspects described herein. While method 340 is described with respect to a single performance metric, it will be appreciated that similar techniques may be used for multiple performance metrics, which may be evaluated individually or as part of a weighted score, among other examples.

Flow progresses to determination 344, where it is determined whether the new model performs better than the existing model. In examples, the determination comprises evaluating the performance metric generated at operation 342 based on a threshold, such that a measured improvement must be above the predetermined threshold. As another example, the determination comprises determining whether the performance metric for the new model is greater than the performance metric for the current model. It will be appreciated that any of a variety of techniques may be used to compare performance metrics. For example, while determination 344 is described as comprising automatic determinations, other examples may comprise a determination based at least in part on a manual indication that is received from a user of the search platform (e.g., from an administrator or a trainer).

If it is determined that the new model does not perform better than the current model, flow branches "NO" to operation 346, where the current model continues to be used for generating search results (e.g., as may be performed by a search processor such as search processor 108 in FIG. 1). In some instances, an indication is generated as to why the current model is retained over the new model. For example, the indication may comprise the performance metric that was generated at operation 342, a set of searches for which the current model performs better, etc. Flow terminates at operation 346.

If, however, it is determined that the new model performs better than the existing model, flow instead branches "YES" to operation 348, where the new model is used to provide search results for subsequent searches. In examples, multiple stages are used, such that operation 348 comprises transitioning a subset of users to use the new model, while a different set of users continue using the current model. If the new model continues to exhibit improved performance, the new model may subsequently be used by a larger subset of users. In other examples, all users of the search platform are transitioned to use the new model at operation 348. Thus, it will be appreciated that any of a variety of techniques may be used to transition from the current model to the new model. Method 340 terminates at operation 348.

FIGS. 4A-4G illustrate example user interface aspects of interactive search training according to the present disclosure. FIGS. 4A-4G comprise similar elements and associated reference numerals, and are therefore not necessarily re-described in detail with respect to subsequent figures. Beginning with FIG. 4A, example view 400 is provided of a search canvas. As illustrated, the search canvas comprises search bar 402, preview pane 404, and search results 408-416. Preview pane 404 may be used to preview one of search results 408-416. As described above, search results 408-416 may be identified by a search platform (e.g., search platform 102 in FIG. 1) as being relevant to the search query in search bar 402 (i.e., "architecture") according to a model. The search canvas further comprises feedback control element 406 that, when actuated by a user, adapts the search canvas to comprise one or more training control elements, similar to those that may be displayed by a training canvas.

Figure 4A:
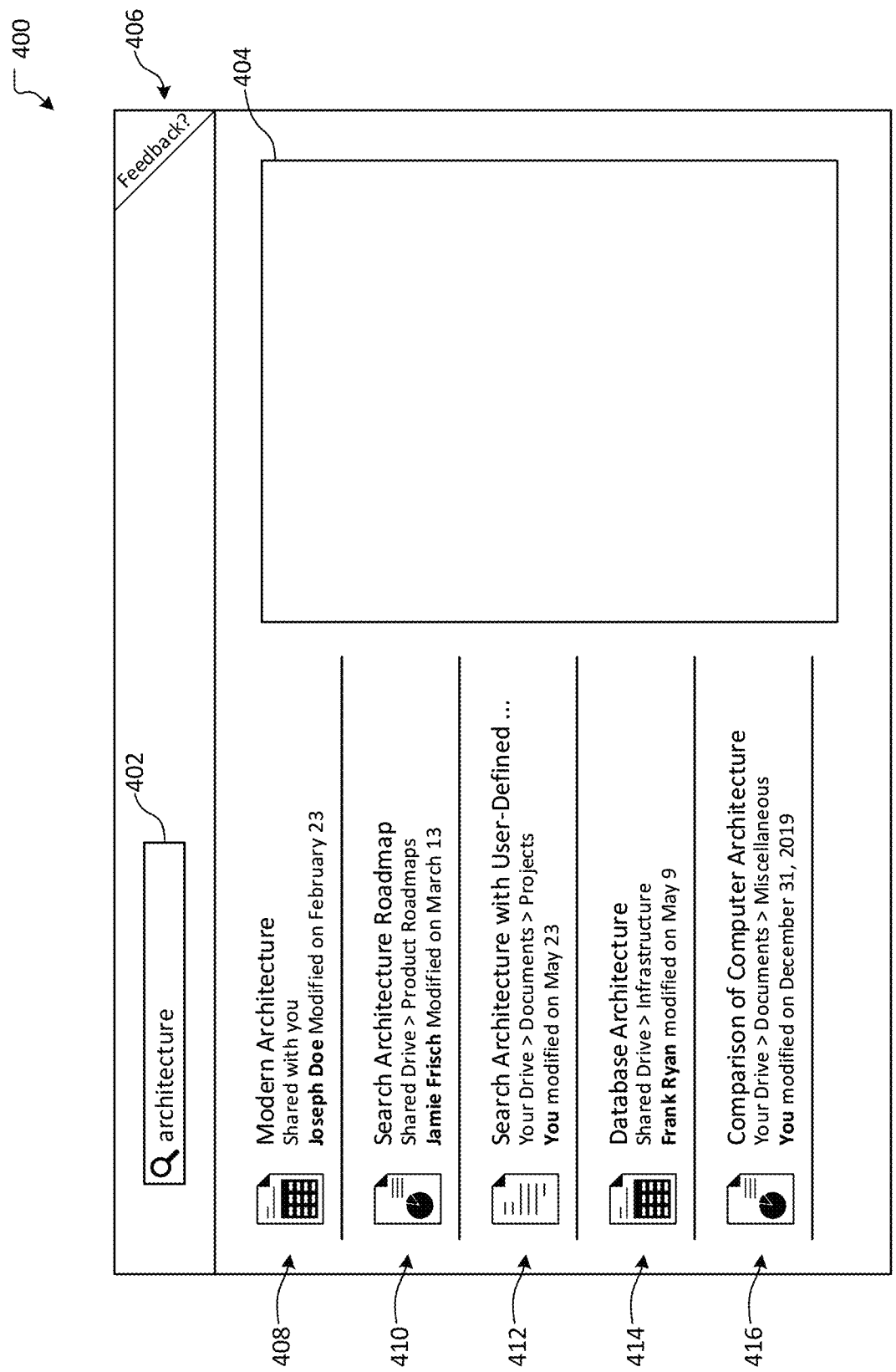
FIGS. 4A-4G illustrate example user interface aspects of interactive search training according to the present disclosure.
Figure 4B:
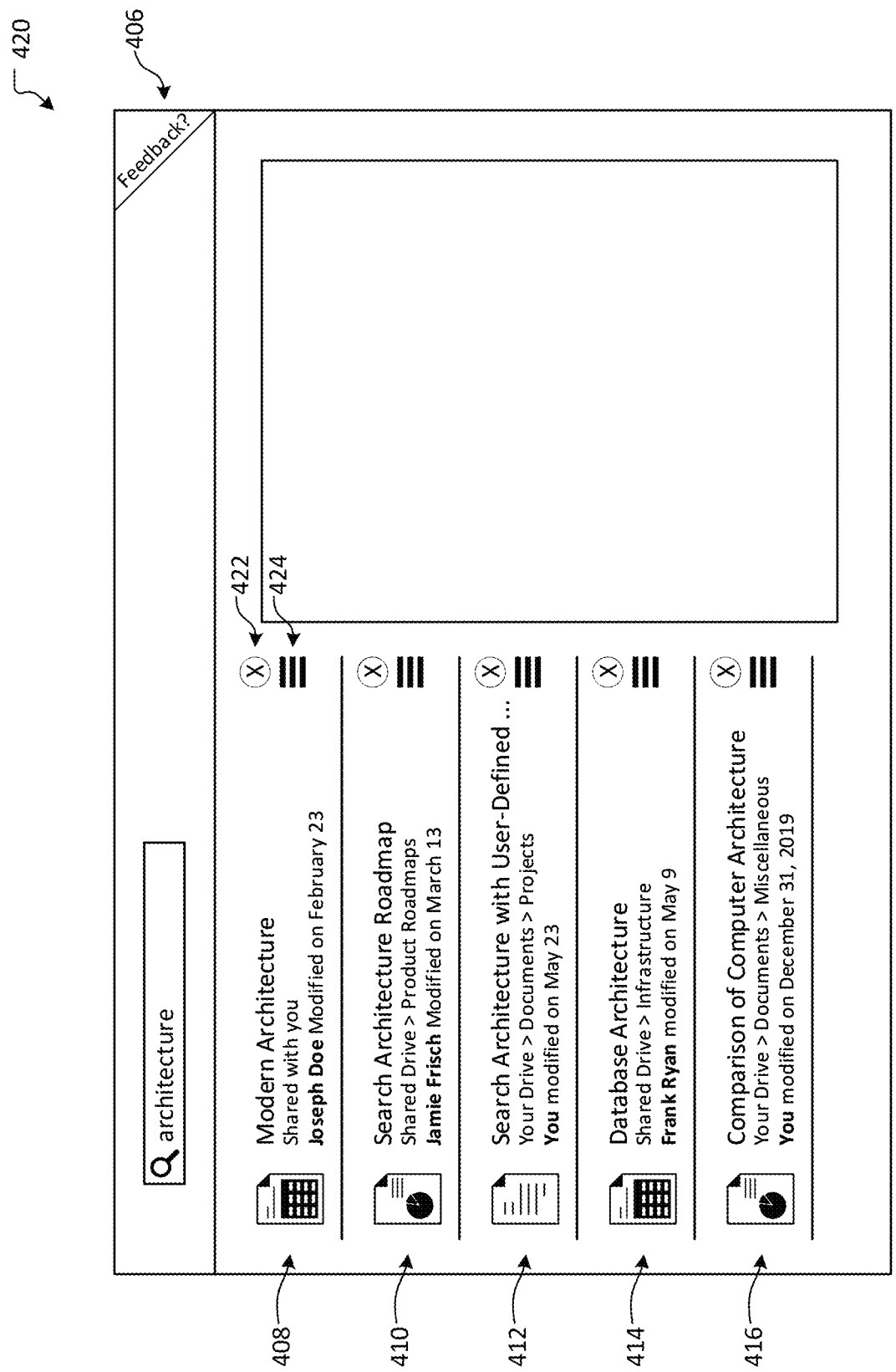

An example of such training control elements in a training canvas is illustrated in view 420 of FIG. 4B. The training canvas discussed below with respect to FIGS. 4B-4G may be presented in response to actuation of feedback control element 406 or, in other examples, the training canvas may be initially presented (e.g., accessed via an administrator portal or in place of a user's default search canvas). With specific reference to search result 408, irrelevant training control element 422 and reorder training control element 424 are provided. Similar aspects are similarly associated with search results 410-416, as shown in view 420.

Irrelevant training control element 422 is usable to indicate that the associated search result (i.e., search result 408) is irrelevant to a given query. As noted above, an irrelevant search result need not be wholly without relevance to the search query (e.g., "modern architecture" may still be generally relevant to a query for "architecture"), but may instead fall below a relevance threshold or may not be perceived by a user to be relevant (e.g., "modern architecture" may not be relevant in the context of computer-related architecture), among other examples. Reorder training control element 424 is usable to drag search result 408 to another position among search results 410-416, thereby indicating a different ranking should be provided for the search results displayed by the canvas.

Figure 4C:
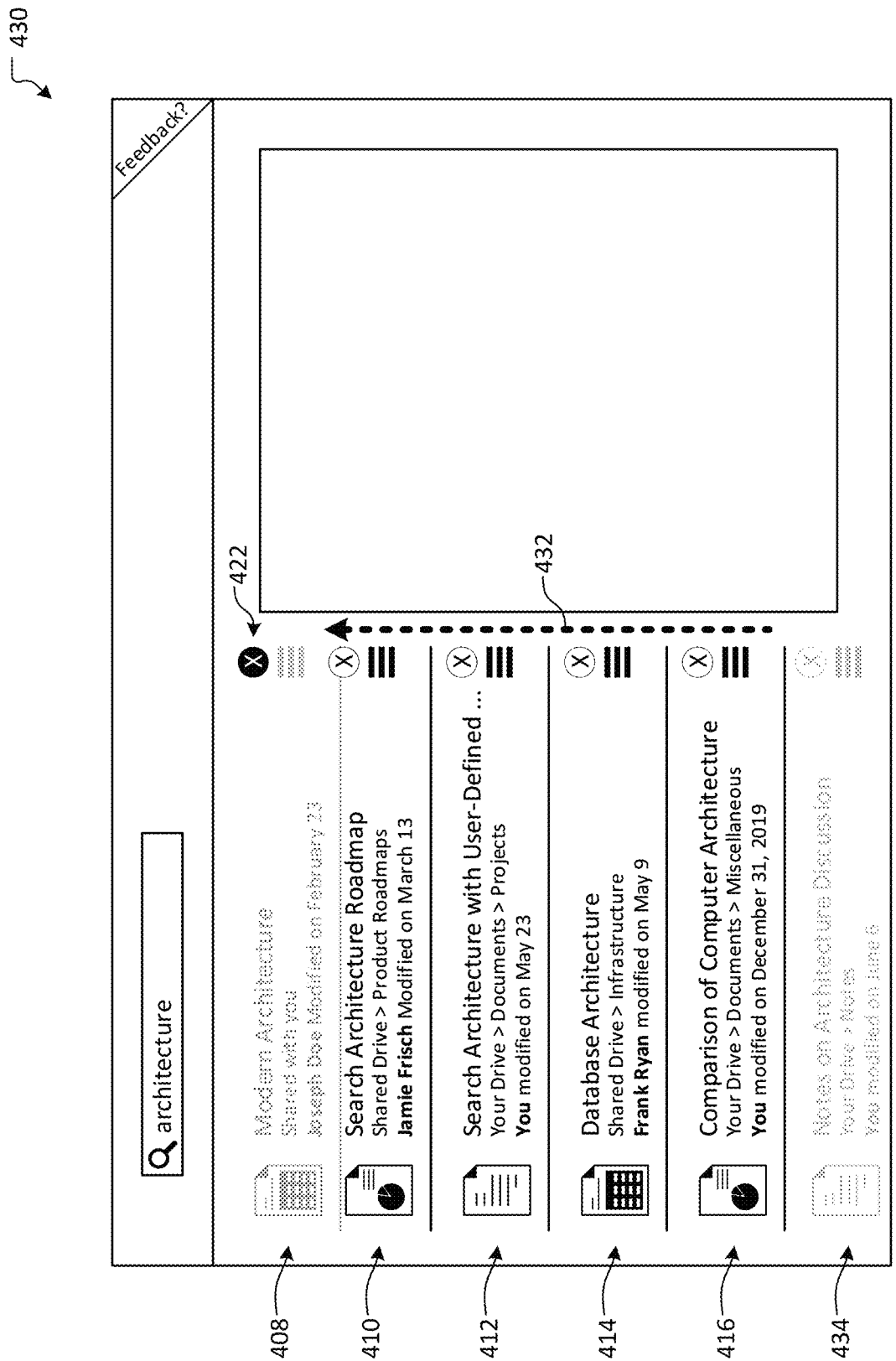
Figure 4D:
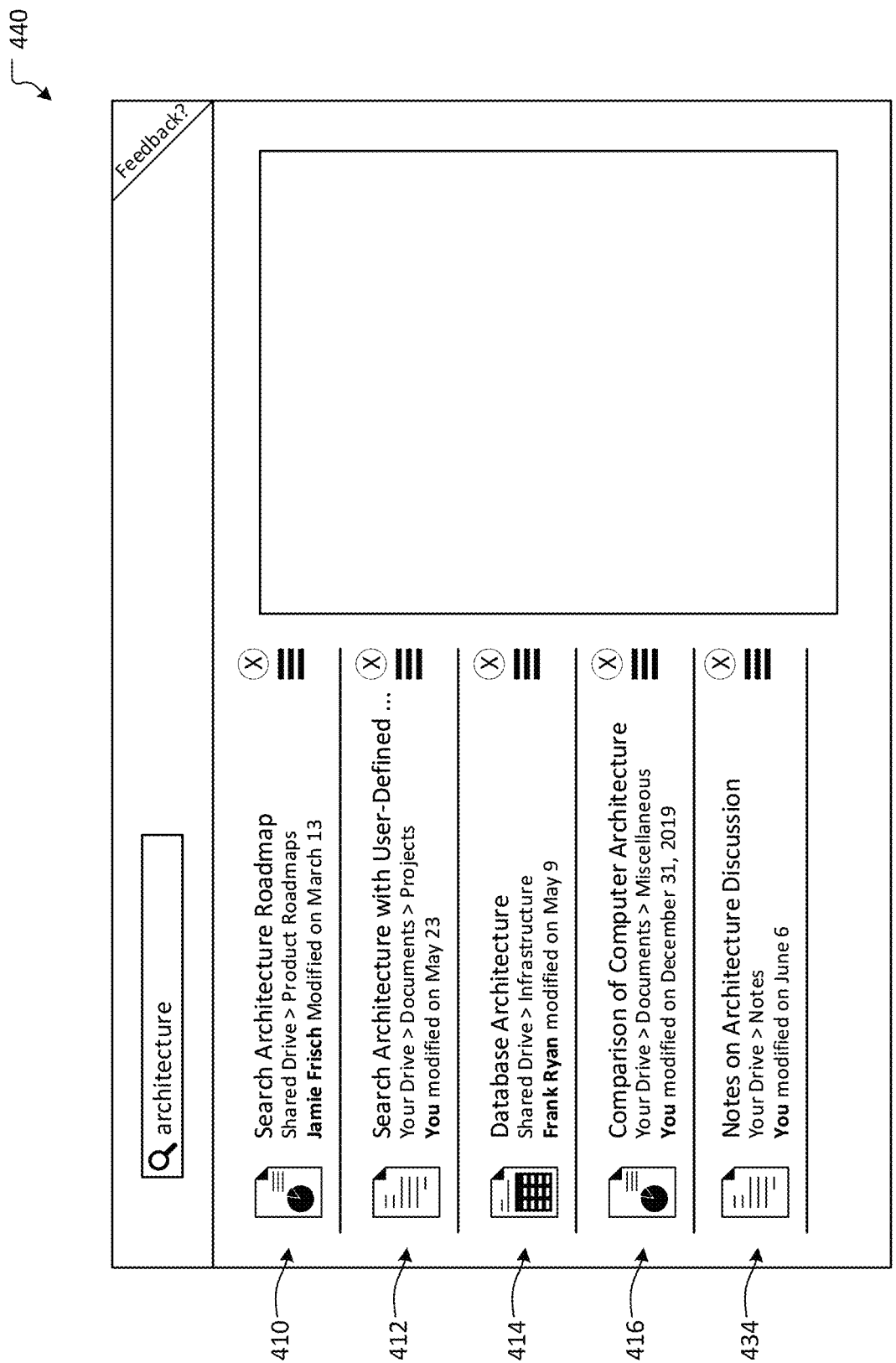

FIG. 4C illustrates example view 430 in which search result 408 is removed from the canvas in response to actuation of irrelevant training control element 422. Accordingly, the display of search results 410-416 is updated to shift search results 410-416 to fill the region previously occupied by search result 408, as illustrated by dashed arrow 432. Additionally, replacement result 434 is added to the end of search results 410-416. Aspects discussed with respect to FIG. 4C may be similar to those discussed above with respect to operations 206-210 of method 200 in FIG. 2. FIG. 4D illustrates example view 440, in which the canvas has been updated to remove irrelevant search result 408 and add replacement search result 434.

Figure 4E:
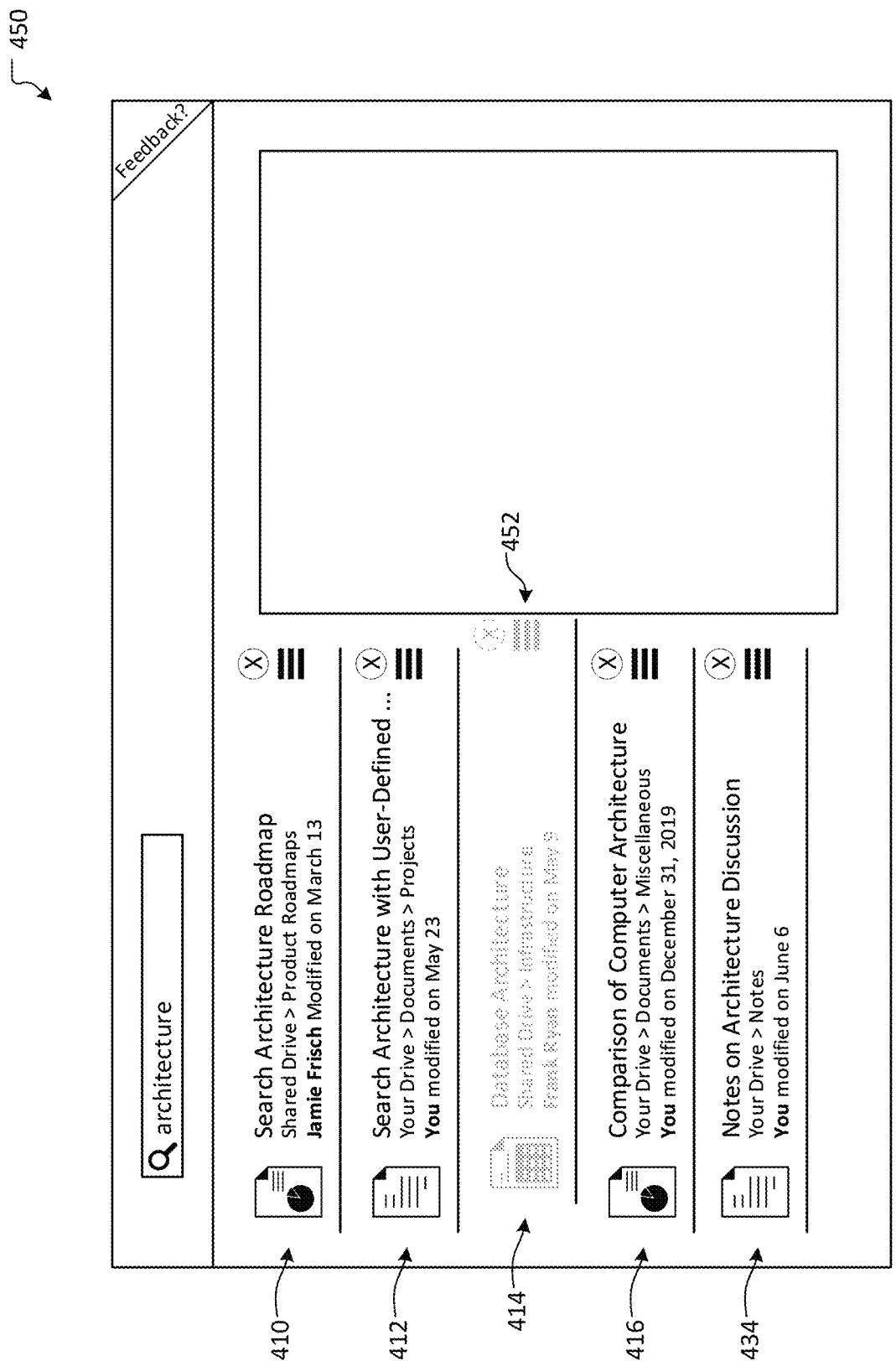
Figure 4F:
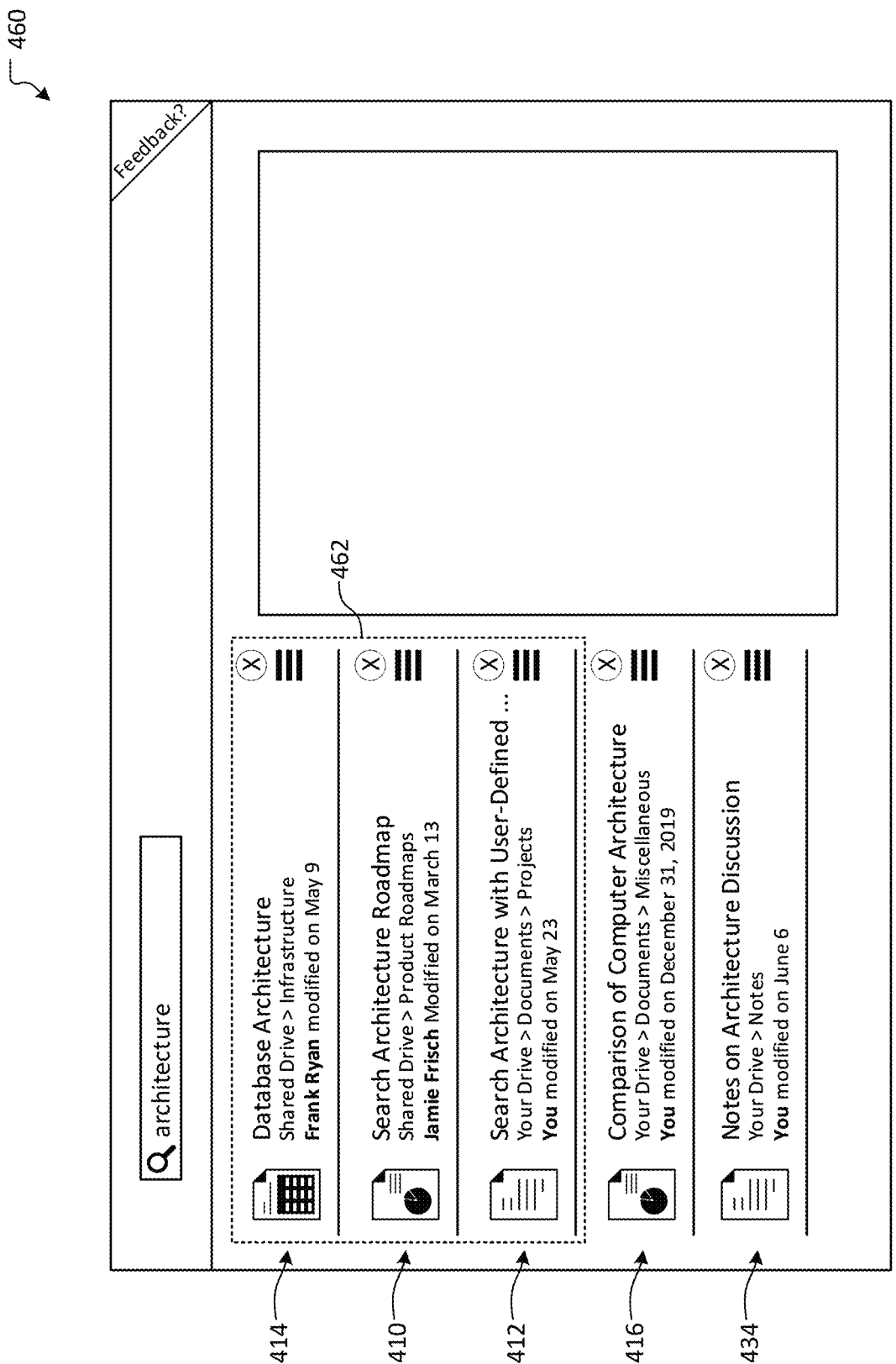

FIG. 4E illustrates example view 450, in which reorder training control element 452 is used to reorder search result 414 in the canvas. As described above, reorder training control element 452 enables a user to drag search result 414 to a different position within the canvas, thereby indicating a different ranking should be applied to the search results displayed therein. FIG. 4F illustrates example view 460, in which search result 414 has been placed at the top of the canvas, above search results 410 and 412 (which were previously ranked above search result 414). Dashed box 462 is provided to illustrate an example of the search results that are provided as part of a reordering indication of feedback information, as may be generated by performing aspects of operations 212-218 of method 200 in FIG. 2. Given search results 416 and 434 have not been reordered by the user, there has been no explicit indication as to the ranking that should be used for training an updated model. By contrast, as a result of moving search result 414, an explicit indication is provided as to the ranking of search result 414 and intervening search results between the previous position of search result 414 and the ending position (i.e., search results 410 and 412).

Figure 4G:
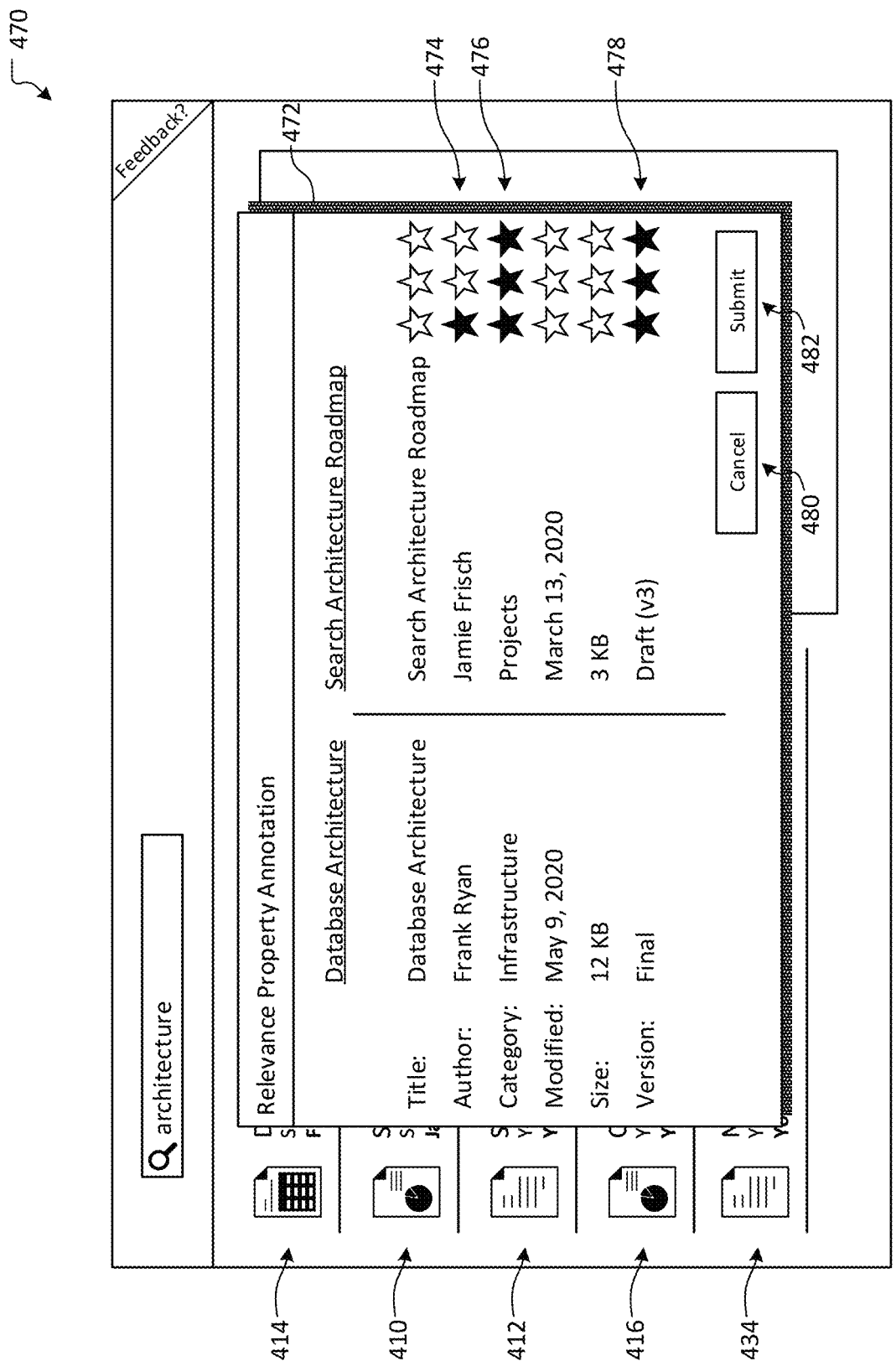

Finally, FIG. 4G illustrates example view 470 of a prompt 472 for a reordering explanation (e.g., as may be generated when performing operation 216 of method 200 in FIG. 2). Prompt 472 illustrates example properties associated with search result 414 (i.e., "Database Architecture") and search result 410 (i.e., "Search Architecture Roadmap"). A user is able to indicate which properties are helpful in reordering the search results and, in the illustrated example, an associated degree (out of three stars). For example, version property 478 and category property 476 are illustrated as having three stars, while author property 474 is illustrated as having a single star. Such additional information is incorporated into the feedback information generated by the canvas according to aspects described herein. The user may subsequently submit the additional information by actuating submit button 482 or cancel submission of the reordering explanation by actuating cancel button 480.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
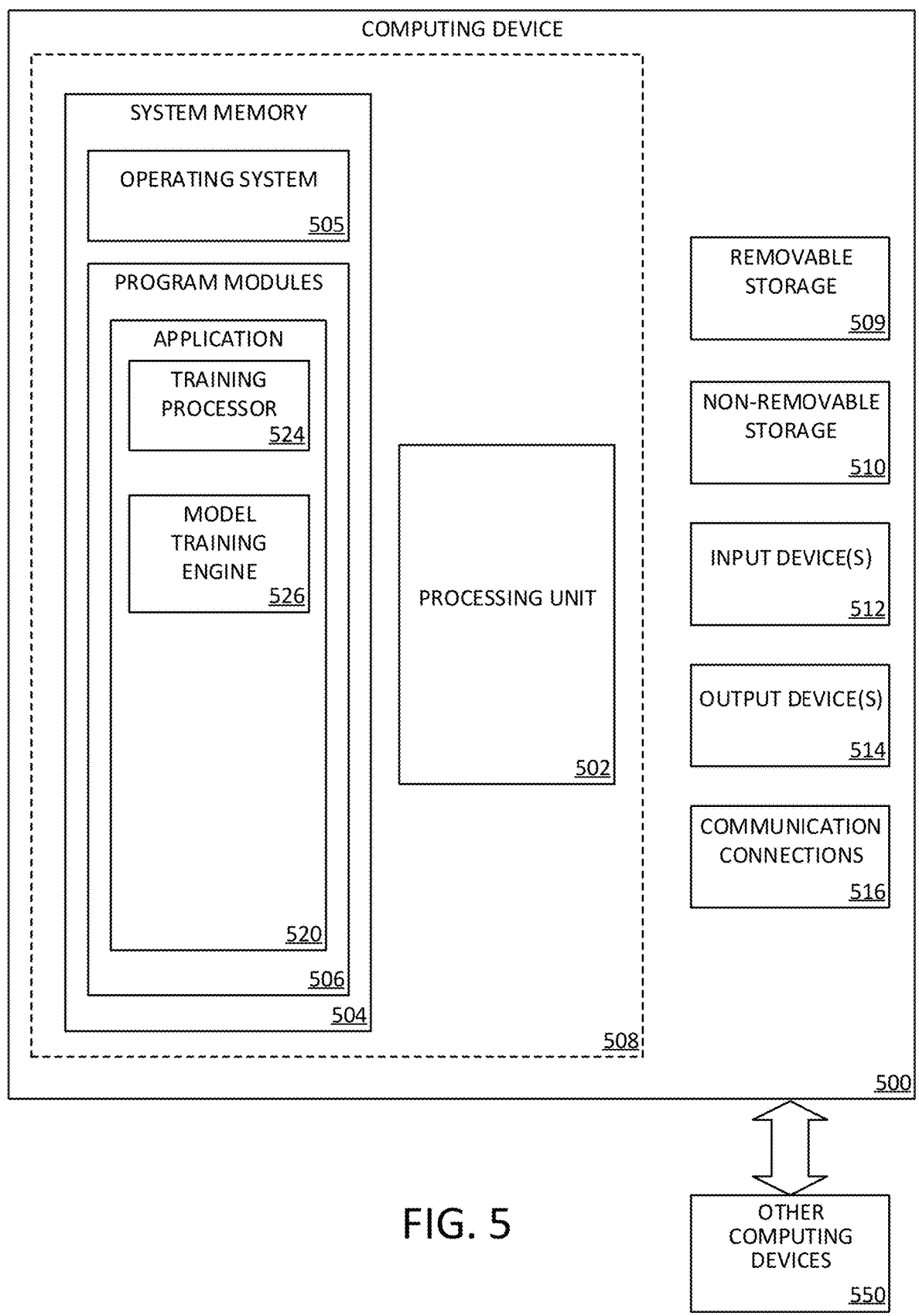
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including the devices 104 and 106, and those associated with search platform 102 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store training processor 524 and model training engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
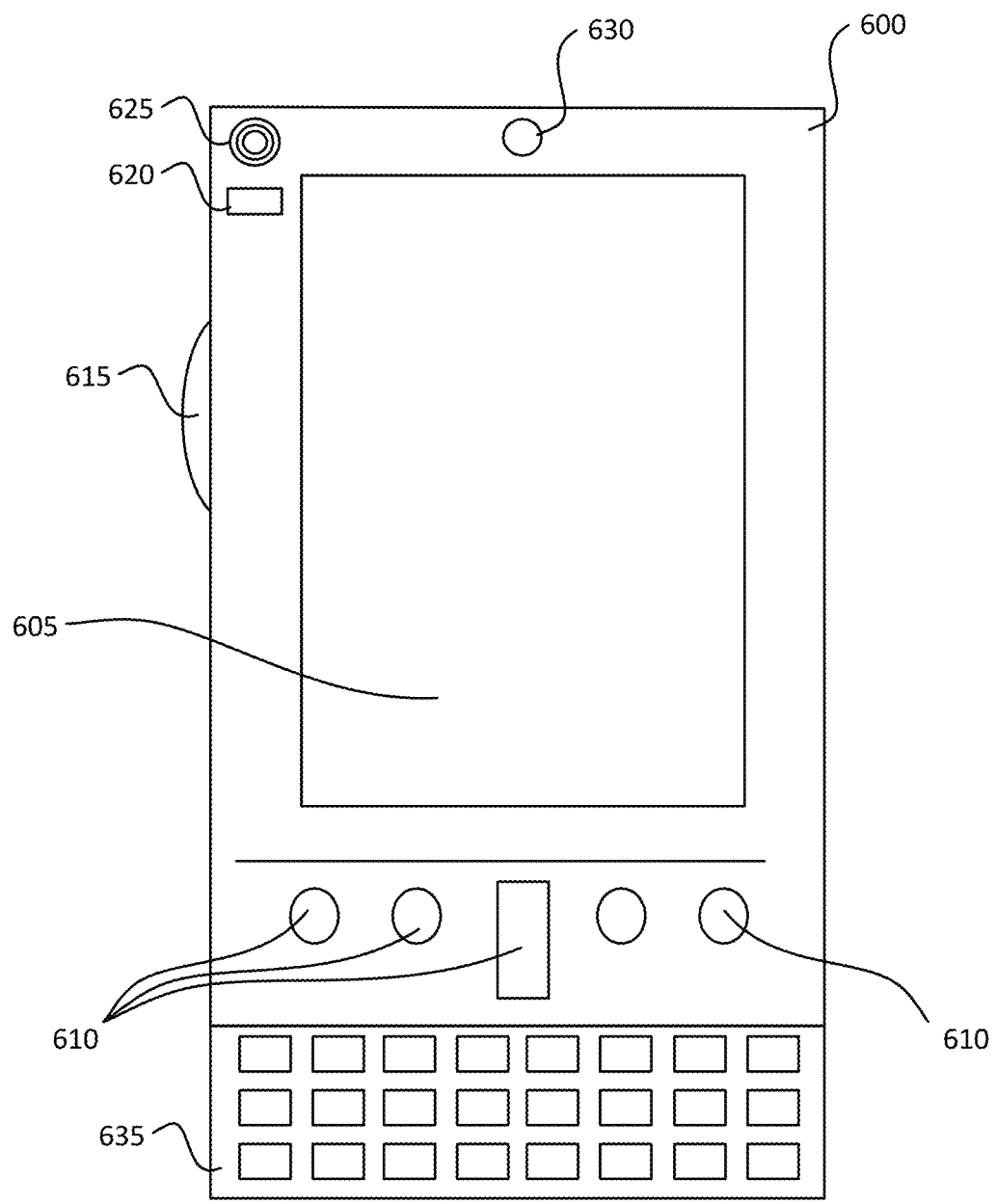
FIGS. 6A and 6B are simplified block diagrams of a mobile computing device with which aspects of the present disclosure may be practiced.
Figure 6B:
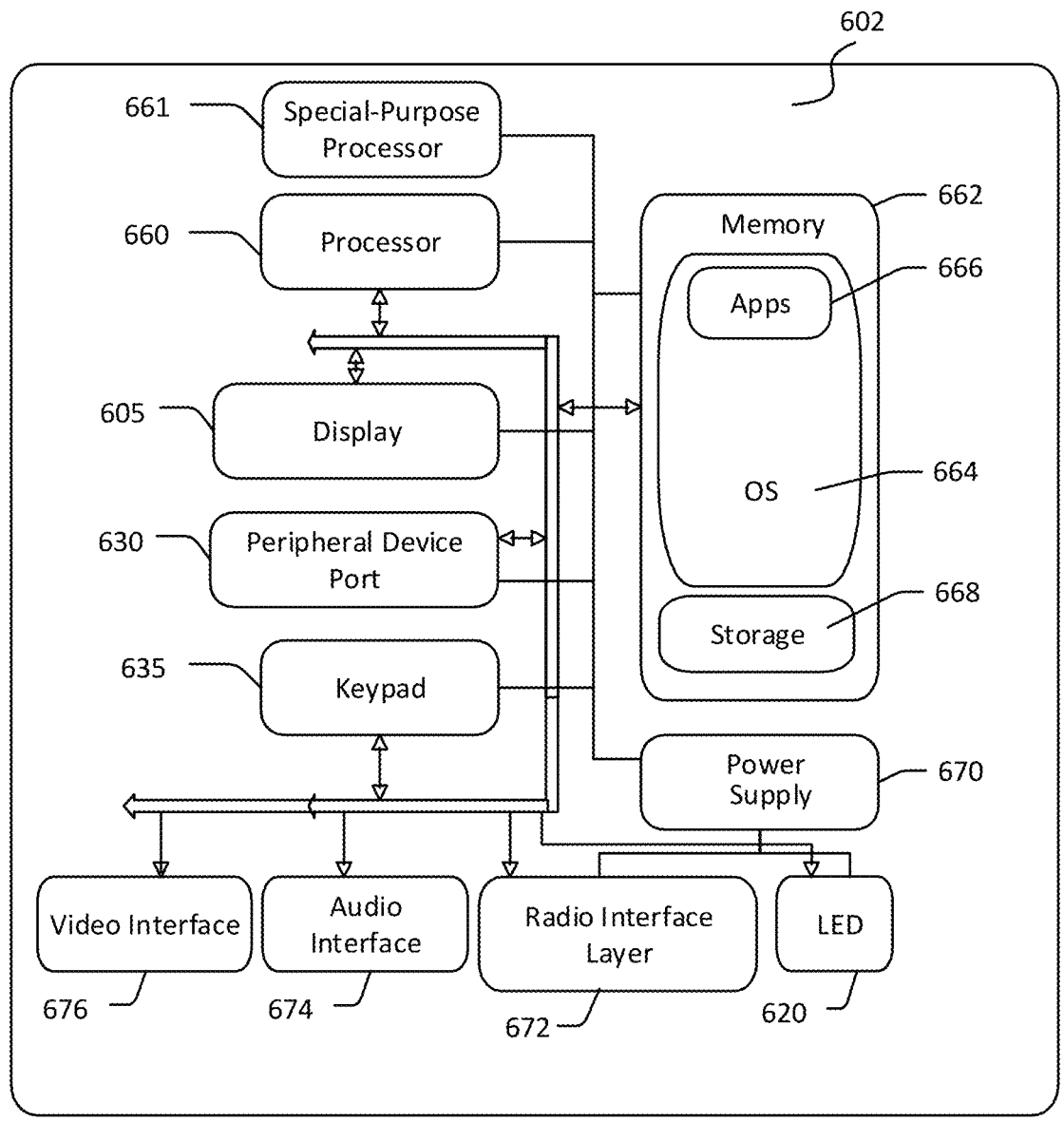

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
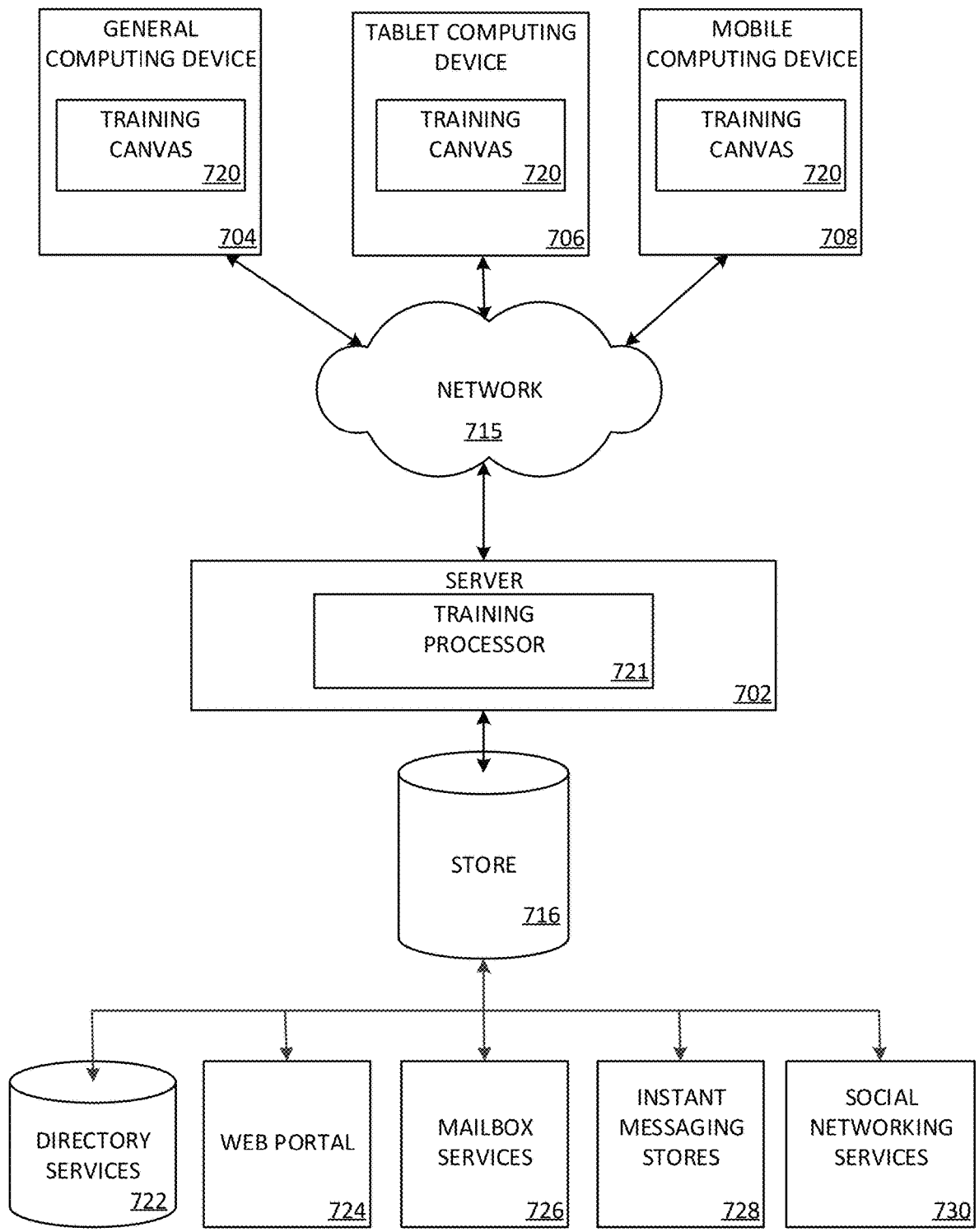
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A training canvas 720 may be employed by a client that communicates with server device 702, and/or training processor 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
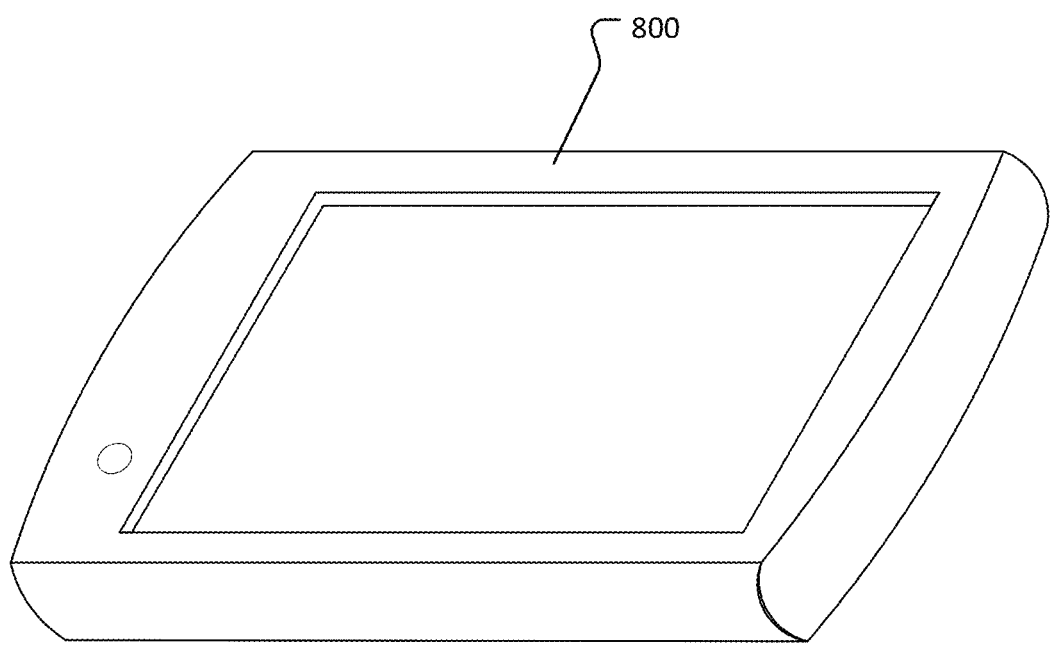
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: generating, as part of a first teaching session, a training canvas comprising a first set of search results associated with a first search query; receiving feedback information comprising an explicit indication associated with a search result of the first set of search results; training a model based at least in part on the explicit indication associated with the search result; and identifying, based on the generated model, a second set of search results based on a second search query that is different from the first search query. In an example, the training canvas further comprises an irrelevant training control element associated with the search result; and the explicit indication associated with the search result is an indication that the search result is irrelevant to the first search query. In another example, the training canvas further comprises a reorder training control element associated with the search result; and the explicit indication associated with the search result is an indication relating to a rank of the search result as compared to another search result of the set of search results. In a further example, the model is further trained based at least in part on training data associated with a different teaching session than the first teaching session. In yet another example, the first set of search results associated with the first search query is generated using an initial model. In a further still example, the set of operations further comprises: receiving a request for an additional search result associated with the first search query; and providing, in response to the received request, the additional search result for the first search query. In another example, the second search query is associated with a different user than the first search query.

In another aspect, the technology relates to a method for generating feedback information via a training canvas. The method comprises: receiving, from a search platform, a set of search results associated with a search query; displaying, at a client device, the training canvas comprising the set of search results, wherein a first search result of the set of search results is displayed in association with an irrelevant training control element and a reorder training control element; receiving, via the training canvas, an explicit indication that is: an indication that the first search result is irrelevant to the search query; or an indication relating to a first rank of the first search result as compared to a second search result of the set of search results; generating feedback information based on the explicit indication; and providing the feedback information to the search platform. In an example, the method further comprises: when the explicit indication is the indication that the first search result is irrelevant to the search query: removing the first search result from the training canvas; and updating the training canvas to comprise a replacement search result. In another example, the method further comprises: when the explicit indication is the indication relating to the first rank of the first search result, determining a second rank of the second search result as compared to the first rank of the first search result. In a further example, the method further comprises: receiving user input comprising the search query; providing the search query to the search platform; and receiving, in response to providing the search query, the set of search results. In yet another example, the method further comprises: receiving, from the search platform a set of search queries; generating a display of a set of search queries; receiving a selection of the search query from the set of search queries; providing the selected search query to the search platform; and receiving, in response to providing the search query, the set of search results. In a further still example, the training canvas is a single page comprising the set of search results.

In a further aspect, the technology relates to a method for generating an updated model for a search platform. The method comprises: generating, as part of a first teaching session, a training canvas comprising a first set of search results associated with a first search query; receiving feedback information comprising an explicit indication associated with a search result of the first set of search results; training a model based at least in part on the explicit indication associated with the search result; and identifying, based on the generated model, a second set of search results based on a second search query that is different from the first search query. In an example, the training canvas further comprises an irrelevant training control element associated with the search result; and the explicit indication associated with the search result is an indication that the search result is irrelevant to the first search query. In another example, the training canvas further comprises a reorder training control element associated with the search result; and the explicit indication associated with the search result is an indication relating to a rank of the search result as compared to another search result of the set of search results. In a further example, the model is further trained based at least in part on training data associated with a different teaching session than the first teaching session. In yet another example, the first set of search results associated with the first search query is generated using an initial model. In a further still example, the method further comprises: receiving a request for an additional search result associated with the first search query; and providing, in response to the received request, the additional search result for the first search query. In another example, wherein the second search query is associated with a different user than the first search query.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and memory storing instructions that, when executed by the at least one processor, causes the system to perform a set of operations, the set of operations comprising:
generating, as part of a first teaching session, a training canvas comprising a first set of search results associated with a first search query, the training canvas comprising a feedback graphical user interface (GUI) associated with one or more training control elements;
receiving feedback information comprising an explicit indication associated with a search result of the first set of search results;
training a model based at least in part on the explicit indication associated with the search result; and
identifying, based on the model associated with the explicit indication received via the feedback interface of the training canvas, a second set of search results based on a second search query that is different from the first search query.

2. The system of claim 1, wherein: the training canvas further comprises an irrelevant training control element associated with the search result; and the explicit indication associated with the search result is an indication that the search result is irrelevant to the first search query.

3. The system of claim 1, wherein: the training canvas further comprises a reorder training control element associated with the search result; and
the explicit indication associated with the search result is an indication relating to a rank of the search result as compared to another search result of the set of search results.

4. The system of claim 1, wherein the model is further trained based at least in part on training data associated with a different teaching session than the first teaching session.

5. The system of claim 1, wherein the first set of search results associated with the first search query is generated using an initial model.

6. The system of claim 2, wherein the set of operations further comprises:
receiving a request for an additional search result associated with the first search query; and
providing, in response to the received request, the additional search result for the first search query.

7. The system of claim 1, wherein the second search query is associated with a different user than the first search query.

8. A method for generating feedback information via a training canvas, comprising:
receiving, from a search platform, a set of search results associated with a search query;
displaying, at a client device, the training canvas comprising a feedback graphical user interface (GUI) associated with one or more training control elements and the set of search results, wherein a first search results of the set of search results is displayed in association with the one or more training control elements comprising an irrelevant training control element and a reorder training control element;
receiving, via the training canvas, an explicit indication that is:
an indication that the first search result is irrelevant to the search query; or
an indication relating to a first rank of the first search result as compared to a second search result of the set of search results;
generating feedback information based on the explicit indication; and
providing the feedback information to the search platform.

9. The method of claim 8, further comprising:
when the explicit indication is the indication that the first search result is irrelevant to the search query:
removing the first search result from the training canvas; and
updating the training canvas to comprise a replacement search result.

10. The method of claim 8, further comprising:
when the explicit indication is the indication relating to the first rank of the first search result, determining a second rank of the second search result as compared to the first rank of the first search result.

11. The method of claim 8, further comprising:
receiving user input comprising the search query;
providing the search query to the search platform; and
receiving, in response to providing the search query, the set of search results.

12. The method of claim 8, further comprising:
receiving, from the search platform a set of search queries;
generating a display of a set of search queries;
receiving a selection of the search query from the set of search queries;
providing the selected search query to the search platform; and
receiving, in response to providing the search query, the set of search results.

13. The method of claim 8, wherein the training canvas is a single page comprising the set of search results.

14. A method for generating an updated model for a search platform, comprising:
generating, as part of a first teaching session, a training canvas comprising a first set of search results associated with a first search query, the training canvas comprising a feedback graphical user interface (GUI) associated with one or more training control elements;
receiving feedback information comprising an explicit indication associated with a search result of the first set of search results;
training a model based at least in part on the explicit indication associated with the search result; and
identifying, based on the model associated with the explicit indication received via the feedback interface of the training canvas, a second set of search results based on a second search query that is different from the first search query.

15. The method of claim 14, wherein:
the training canvas further comprises an irrelevant training control element associated with the search result; and the explicit indication associated with the search result is an indication that the search result is irrelevant to the first search query.

16. The method of claim 14, wherein:

the training canvas further comprises a reorder training control element associated with the search result; and the explicit indication associated with the search result is an indication relating to a rank of the search result as compared to another search result of the set of search results.

17. The method of claim 14, wherein the model is further trained based at least in part on training data associated with a different teaching session than the first teaching session.

18. The method of claim 14, wherein the first set of search results associated with the first search query is generated using an initial model.

19. The method of claim 14, further comprising:

receiving a request for an additional search result associated with the first search query; and providing, in response to the received request, the additional search result for the first search query.

20. The method of claim 14, wherein the second search query is associated with a different user than the first search query.

* * * * *